2,722,500

REMOVAL OF ACIDIC GASES FROM HYDROCARBON GASES AND LIQUIDS

Charles W. Rippie and Howard B. Bishop, Summit, N. J.

No Drawing. Application February 5, 1954,
Serial No. 408,581

4 Claims. (Cl. 196—23)

This invention relates to a method of removing volatile acidic substances such as hydrogen sulfide and carbon dioxide from non-aqueous fluids.

Because the invention is particularly adapted for removing acidic gases from liquid and gaseous petroleum products including natural gas, it will be first illustrated therefore by description in connection with such use.

In the art of removing hydrogen sulfide, carbon dioxide, or both from petroleum and like fluids, that is, deacidifying to a remaining permissible proportion, it is customary to pass the fluid countercurrent to and in good contact with the deacidifying agent in aqueous solution. Agents commonly used or proposed for this purpose include the alkanolamines, potassium phosphate, and soda ash. These deacidifying agents are considered to function by converting the acidic gases at low temperatures to a non-volatile form, such as salts or addition products, and are regenerated for reuse when the solution containing them is heated to its boiling point.

Although deacidifying agents and this type of process are in very extensive use in the petroleum and natural gas industries at home and abroad, certain difficulties have been encountered.

Diethanolamine, for instance, one of the most widely used of the alkanolamines for extraction of the acidic gases from petroleum liquids, is soluble to the extent of about 1 lb. in each 25 barrels of gasoline treated. This means that the daily loss of diethanolamine by solution in the gasoline in a refinery where the amine is used is very large. Also the diethanolamine is corrosive, particularly in the heat exchangers and regenerators commonly present in the deacidifying unit. Furthermore, the diethanolamine does not give complete extraction of the acidic gases; with hydrogen sulfide, for example, the amine leaves approximately 5 grains of $H_2S$ in 100 cu. ft. of natural gas or its liquid equivalent.

As a result of these and other disadvantages, there is now some use of potassium phosphate ($K_3PO_4$) as a substitute for the diethanolamine. Solubility problems arise, however, in this use. The potassium phosphate must be used in concentrated solution in order to give adequate absorbing capacity for the acidic gases. Thus it has been proposed to use potassium phosphate in the proportion of 50 parts by weight to 100 of the solution. As the potassium phosphate reacts with the acidic substances, however, the normal phosphate becomes an acid phosphate such as $K_2HPO_4$ or possibly $KH_2PO_4$. These various phosphates have different solubilities at the temperature of absorption, so that crystallization or precipitation of one or more of them becomes a factor that limits the concentration that may be used in the absorbing (deacidifying) operation. Furthermore, the potassium phosphate solutions require relatively large amounts of heat for regeneration because of the high boiling points of the concentrated solutions, this also increasing the size of equipment for effecting regeneration. Finally, the phosphate forms complexes with carbon dioxide which interfere with ready regeneration of phosphate for reuse in absorption of carbon dioxide.

This invention provides a method for absorbing the acidic gases from liquid petroleum, natural gas, coal tar liquids, and other non-aqueous liquids and gases, without the foregoing disadvantages.

We have now discovered means of preserving in a deacidifying agent the advantages of the alkanolamines without the disadvantages.

Briefly stated our invention comprises the use of an alkanolamine in conjunction with a component that is strongly hydrophilic, attaches itself to the amine, so as to prevent the amine from dissolving and disappearing in costly amount in the non-aqueous fluid being treated, and, at the same time, gives up some of the amine to the acidic material to be removed from the said fluid. Such component that we use is an acid of special kind. It is convenient to react the acid in advance with the amine. In its final embodiment, therefore, the invention comprises the process of removing volatile acidic substances from non-aqueous fluids by contacting them with an aqueous solution of an alkanolamine salt of acid of kind to be described.

The acid selected must be one that ionizes in at least two steps. In the first step, the constant of ionization ($K_A$) must be so large that hydrolysis of the alkanolamine salt in water to the free acid is very limited and for practical purposes is negligible, that is approximately $10^{-3}$ or higher. Also we have found that our salt solution must have a pH of at least 7–8 during the absorption of the volatile acidic substance.

This means, first of all, that the acid represented in the alkanolamine salt must be a di- or other polybasic acid.

The equipment that we use is conventional in the industry and is, therefore, not illustrated.

To demonstrate in simple manner the effectiveness of our class of agents in removing hydrogen sulfide, we have shaken gasoline containing hydrogen sulfide with a 15% aqueous solution of triethanolamine phosphate. After a minute or so, the aqueous and non-aqueous layers were separated. The gasoline layer was titrated for sulfide content electrometrically with N/100 alcoholic silver nitrate solution. The titration showed approximately 98% of the total sulfur present to have been removed. More specifically, the $H_2S$ content was lowered from 15.40 mg. per 100 ml. of the gasoline used to 0.35 mg. in the product. The remaining hydrogen sulfide corresponds to about 0.013 g. per gallon of gasoline. In later tests, extraction of the hydrogen sulfide has been substantially 100% complete.

As to materials, we know of no substitute for the alkanolamines that are effective as the basic component of the salt in our process. As the alkanolamine, we use the mono-, di-, or triethanolamine or the corresponding propanol or isopropanol amine.

Acids of the kind that we use in combination with the alkanolamine give salts with these amines that are hydrophilic, stable in water, that is, against hydrolysis to the free acid stage, practically insoluble in the hydrocarbon to be deacidified, such as petroleum and coal distillation liquids and gases, have high absorption capacity in their aqueous solutions for hydrogen sulfide and carbon dioxide, and lose these volatile acidic substances quickly when the solutions are heated to regenerate them to condition for reuse.

The acid should also be reasonably inexpensive per unit of weight, although in our process there is such decreased loss of the agent, because of its relative insolubility in the non-aqueous fluid undergoing treatment, that the importance of the initial cost is reduced.

Acids that meet these requirements particularly well and that may be used are phosphoric and hydrofluoric.

The phosphoric gives with the alkanolamines compounds of the type represented by the formula above. Hydrofluoric acid ($H_2F_2$) gives with triethanolamine, for instance, salts that may be represented by the formula $[(C_2H_4OH)_3NH]_2F_2$.

Another composition that we use to advantage is a mixture of salts of the phosphoric and hydrofluoric acids. An example is one containing hydrofluoric acid and phosphoric acid in equivalent proportions, that is, in the ratio of 2 moles of the phosphoric acid to 3 of the hydrofluoric acid considered as $H_2F_2$. In general the proportion may vary from 1–3 equivalents (as acid) to 6 for the two acids. Such mixtures make possible greater absorptive capacity per gallon without exceeding the solubility of any salt used or made in the deacidification. Also the common ion that results in a solution of the salt mixture decreases hydrolysis which, although slight at the worst, is a condition to be avoided as fully as possible.

In place of the phosphoric and hydrofluoric acids used separately or jointly, we may use alone or mixed with the acids named one of the following: orthophosphorus and oxalic acid.

The invention will be further illustrated by description in connection with the following specific examples of the practice of it.

In these examples and elsewhere herein, proportions are expressed as parts by weight unless specifically stated to the contrary.

Example 1

Triethanolamine phosphate product was made as follows: 45 parts of triethanolamine and 10 parts of orthophosphoric acid (molecular proportions about 3:1) diluted with water were heated in a flask with a reflux condenser and water trap. The boiling was continued until no additional water could be measured in the water trap, at which time the reaction of the triethanolamine and the phosphoric acid was considered complete. The Encyclopedia of Chemical Technology, by Kirk and Othmer, vol. V, page 853, states that the internal rearrangement of ethanolamine salts of acid on heating gives rise to aminoalkyl salts. We consider that the amine group thus provided is available for reaction with the hydrogen sulfide or the like while the hydrophilic and volatility decreasing salt, in this instance the phosphate, decreases the loss of the amine compound by solution in the liquid being treated for acidic component removal and also the loss by volatilization during the recovery of the treating agent. 1000 parts of naphtha containing 25.5 mg. of hydrogen sulfide sulfur per 100 ml. were shaken with 18 parts of the above amine phosphate salt dissolved in 7 times its weight of water, settled, and analyzed. Electrometric titration of the hydrogen sulfide sulfur with N/100 alcoholic silver nitrate solution showed that the hydrogen sulfide sulfur was extracted to extent of 95%.

Example 2

300 parts of triethanolamine and 40 parts of hydrofluoric acid (molecular proportions about 2 of the amine to 1 of $H_2F_2$) were combined by heating as in Example 1. 100 ml. of gasoline containing 25.1 mg. of hydrogen sulfide sulfur were shaken with 3.2 g. of the above amine fluoride salt dissolved in 10 ml. of water, for 1 min., settled, and analyzed by the same electrometric titration. The test showed that the hydrogen sulfide sulfur was extracted, to the extent of more than 99%.

Example 3

100 ml. of naphtha containing 25.5 mg. of hydrogen sulfide sulfur were extracted with equal molecular quantities of the amine phosphate and amine fluoride salts dissolved in 10 ml. of water, settled and analyzed. The test showed only 0.64 mg. of hydrogen sulfide remained or the hydrogen sulfide sulfur was extracted to extent of more than 99%.

Example 4

100 ml. of gasoline containing acidic gas including hydrogen sulfide was shaken in a 150 ml. separatory funnel with 10 ml. of the heated triethanolamine phosphate reaction product of Example 1, in an aqueous solution of concentration 8%, for 1 min. The spent aqueous solution was separated, a sample was mixed with an equal volume of N/10 iodine in an acidified aqueous solution, shaken for 1 min. in a glass stoppered flask, and back titrated with N/10 sodium thiosulfate solution using starch indicator. The above spent solution was found to contain 2.14 g. of hydrogen sulfide sulfur per liter. The spent solution was then heated to the boiling point. This caused expulsion of volatile acidic material that rose as bubbles through the heated solution. The resulting regenerated solution contained only 0.16 g. of hydrogen sulfide sulfur per liter.

This example shows that the spent deacidifying solution is readily regenerated.

Example 5

70 ml. of gasoline containing 128 mg. of $H_2S$ per 100 ml. and 5 ml. of 15% aqueous solution of the heated triethanolamine phosphate reaction product of Example 1 were shaken for 3 min. in a separatory funnel, settled, and the aqueous solution withdrawn, that is, separated by difference of specific gravity. The treated gasoline contained 16 mg. of hydrogen sulfide sulfur per 100 ml. This is a reduction of 112 mg. or about 87% of the original content. Since the ratio of the gasoline to the aqueous solution is 14:1 by volume, the spent triethanolamine phosphate solution had a sulfur concentration of $14 \times 78.4$ or 1092 mg. per 100 ml. This test shows that triethanolamine phosphate product has a comparatively high absorbing capacity of $H_2S$ from gasoline.

Example 6

The comparative insolubility of the heated triethanolamine phosphate product of Example 1 in gasoline is shown by the following test.

100 ml. of gasoline was shaken in a separatory funnel with 10 ml. of a 15% solution of triethanolamine phosphate for 3 min. The aqueous solution was then removed, the gasoline filtered, and the filtered gasoline shaken with 20 ml. of 5% solution of barium chloride. No barium phosphate precipitate appeared. In contrast, 5 ml. of a 0.0015% triethanolamine phosphate solution gave a marked precipitate with the same amount of barium chloride used in the above experiment.

Temperatures of contact of the solution of heated alkanolamine salt with the hydrocarbon fluid (liquid or gas) during the absorption of the acidic substance should be relatively low, as, for example, not above 160° F. and suitably 60°–120°. During this absorption, the hydrocarbon is under the usual pressure for deacidification such as pressures of 20–100 lbs./sq. in. for the fluid in liquid form and 30–50 lbs. for the fluid in gaseous state, as in natural gas.

In the regeneration by boiling, pressures ordinarily are atmospheric.

By "volatile" as applied to the acidic substance, we mean normally gaseous.

It will be understood that it is intended to cover all changes and modifications of the examples of the invention herein chosen for the purpose of illustration which do not constitute departures from the spirit and scope of the invention.

What we claim is:

1. In removing a volatile acidic substance from a hydrocarbon fluid, the process which comprises contacting the fluid with an aqueous solution of the product of heating an alkanolamine salt of a hydrophilic polybasic acid of ionization constant ($K_A$) that in the first step is at least as high as about $10^{-3}$ and whose salt with the alkanolamine is freely soluble and stable in water but practically insoluble in the hydrocarbon fluid, continuing the contact until the content of the said acidic substance is lowered to permissible proportion, and then separating the said solution and liquid by difference of specific gravity.

2. In removing a volatile acidic substance from a hydrocarbon fluid, the process which comprises contacting the fluid at low temperature with the product of heating an aqueous solution of an alkanolamine salt of phosphoric acid, continuing the contact until the acidic content of the substance is lowered to permissible proportion, and then separating the said solution and liquid by difference of specific gravity.

3. In removing a volatile acidic substance from a hydrocarbon fluid, the process which comprises contacting the fluid at low temperature with the product of heating an aqueous solution of triethanolamine ortho-phosphate, continuing the contact until the content of the acidic substance is lowered to permissible proportion, and then separating the said solution and liquid by difference of specific gravity.

4. The process of claim 1 which includes maintaining the said solution of the alkanolamine salt at a temperature not above 160° F. during the contact with the hydrocarbon fluid and heating the separated solution to expel the volatile acidic substance and regenerate the separated solution for reuse.

References Cited in the file of this patent

UNITED STATES PATENTS

| | | |
|---|---|---|
| 2,156,577 | Yabroff et al. | May 2, 1939 |
| 2,242,323 | Powell | May 20, 1941 |
| 2,411,105 | Nixon et al. | Nov. 12, 1946 |
| 2,426,087 | Fetterly | Aug. 19, 1947 |
| 2,592,523 | Ayers et al. | Apr. 15, 1952 |
| 2,666,794 | Talbert | Jan. 19, 1954 |

OTHER REFERENCES

Elder: Textbook of Chemistry (rev. ed.), page 238 (1948).